United States Patent [19]

Herbst et al.

[11] Patent Number: 4,966,681

[45] Date of Patent: Oct. 30, 1990

[54] MULTIPLE RISER FLUIDIZED CATALYTIC CRACKING PROCESS UTILIZING A $C_3$-$C_4$ PARAFFIN-RICH CO-FEED AND MIXED CATALYST SYSTEM

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 332,418

[22] Filed: Mar. 30, 1989

Related U.S. Application Data

[63] Continuation of Ser. No. 144,788, Jan. 21, 1988, abandoned, which is a continuation of Ser. No. 903,161, Sep. 3, 1986, abandoned.

[51] Int. Cl.$^5$ ............................................. C10G 57/00
[52] U.S. Cl. ..................................... 208/74; 208/78; 208/89; 208/120; 208/155
[58] Field of Search ................... 208/120, 113, 89, 78, 208/74, 164, 155; 502/67

[56] References Cited

U.S. PATENT DOCUMENTS

| | | | |
|---|---|---|---|
| 3,617,497 | 11/1971 | Bryson et al. | 208/80 |
| 3,748,251 | 7/1973 | Demmel et al. | 208/74 |
| 3,847,793 | 11/1974 | Schwartz et al. | 208/70 |
| 3,849,291 | 11/1974 | Owen | 208/78 |
| 3,856,659 | 12/1974 | Owen | 208/79 |
| 3,894,931 | 7/1975 | Nace et al. | 208/73 |
| 3,894,932 | 7/1975 | Owen | 208/74 |
| 3,894,933 | 7/1975 | Owen et al. | 208/77 |
| 3,894,934 | 7/1975 | Owen et al. | 208/78 |
| 3,894,935 | 7/1975 | Owen | 208/78 |
| 3,907,663 | 9/1975 | Owen | 208/70 |
| 3,926,778 | 12/1975 | Owen et al. | 208/74 |
| 3,928,172 | 12/1975 | Davis, Jr. et al. | 208/77 |
| 3,974,062 | 8/1976 | Owen et al. | 208/74 |
| 4,032,432 | 6/1977 | Owen | 208/71 |
| 4,035,285 | 7/1977 | Owen et al. | 208/74 |
| 4,090,949 | 5/1978 | Owen et al. | 208/102 |
| 4,116,814 | 9/1978 | Zahner | 208/78 |
| 4,287,088 | 9/1981 | Sirkar | 208/520 X |
| 4,294,688 | 10/1981 | Mayer | 208/149 |
| 4,309,279 | 1/1982 | Chester et al. | 208/120 |
| 4,368,114 | 1/1983 | Chester et al. | 208/120 |
| 4,422,925 | 12/1983 | Williams | 208/75 |
| 4,490,241 | 12/1984 | Chou | 208/75 |
| 4,606,810 | 8/1986 | Krambeck et al. | 208/74 |
| 4,717,466 | 1/1988 | Herbst et al. | 208/113 |
| 4,749,470 | 6/1988 | Herbst et al. | 208/85 |
| 4,752,375 | 6/1988 | Herbst et al. | 208/74 |

FOREIGN PATENT DOCUMENTS

| | | | |
|---|---|---|---|
| 0074501 | 3/1983 | European Pat. Off. | 208/120 |
| 0101553 | 2/1984 | European Pat. Off. | 208/120 |
| 0171460 | 2/1986 | European Pat. Off. | 208/120 |

*Primary Examiner*—Anthony McFarlane
*Attorney, Agent, or Firm*—Alexander J. McKillop; Charles J. Speciale; Marina V. Schneller

[57] ABSTRACT

A catalytic cracking process is described featuring multiple risers in which a variety of hydrocarbon conversion reactions take place, a stripping unit in which entrained hydrocarbon material is removed from catalyst and a regeneration zone in which spent cracking catalyst is regenerated, which comprises:

(a) catalytically cracking a relatively high boiling hydrocarbon charge material in a first riser in the presence of both a first catalyst component which is an amorphous cracking catalyst and/or a large pore crystalline cracking catalyst and a second catalyst component which is selected from zeolite Beta and/or medium pore crystalline silicate zeolite catalyst to provide a variety of products including naphtha and $C_3$ and/or $C_4$ olefin;

(b) thermally cracking a $C_{3-6}$ paraffin-rich charge material introduced to a second riser in a lower region thereof to provide light olefins; and, (c) catalytically converting at least a portion of the light olefins resulting from step (b) within the second riser in a higher region thereof in the presence mainly of a second catalyst component which is at least one member of the group consisting of zeolite Beta and a shape-selective medium pore crystalline silicate zeolite catalyst to provide a relatively high octane gasoline product.

12 Claims, 2 Drawing Sheets

MULTIPLE RISER FLUIDIZED CATALYTIC CRACKING PROCESS UTILIZING A $C_3$–$C_4$ PARAFFIN-RICH CO-FEED AND MIXED CATALYST SYSTEM

This is a continuation of copending application Ser. No. 144,788, filed on Jan 21, 1988, now abandoned which is a continuation of copending application Ser. No. 903,161, filed on Sept. 3, 1986, now abandoned.

BACKGROUND OF THE INVENTION

This invention relates to a multiple riser catalytic cracking operation utilizing a $C_{3-4}$ paraffin-rich co-feed as a source of light olefins for subsequent conversion to gasoline boiling range components and further features the use of a mixed catalyst system comprising, as a first component, an amorphous cracking catalyst and/or a large pore crystalline cracking catalyst, e.g., zeolite Y, and, as a second component, zeolite Beta and/or a shape selective medium pore crystalline silicate zeolite catalyst, e.g., zeolite ZSM-5.

In known and conventional fluidized catalytic cracking processes, a relatively heavy hydrocarbon feedstock, e.g., a gas oil, admixed with a suitable cracking catalyst, e.g., a large pore crystalline silicate zeolite such as zeolite Y, to provide a fluidized suspension is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidized catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

U.S. Pat. No. 3,894,932 describes a single riser fluid catalytic cracking operation in which a gas oil and a $C_{3-4}$-rich gaseous material is converted to aromatics and isobutane in the presence of a faujasite-type zeolite, e.g., zeolite Y.

U.S. Pat. No. 3,894,935 describes a dual riser fluid catalytic cracking process in which a gas oil is catalytically cracked in a first riser in the presence of a faujasite-type zeolite such as zeolite Y to provide gasoline boiling-range material and a $C_{3-4}$-rich hydrocarbon fraction or isobutylene is converted in a second riser in the presence of hot regenerated catalyst or catalyst cascaded thereto from the first riser to provide aromatics, alkyl aromatics and low boiling gaseous material.

Several of the processes referred to above employ a mixed catalyst system with each component of the system possessing different catalytic properties and functions. For example, in the dual riser hydrocarbon conversion process described in U.S. Pat. No. 3,894,934, a heavy hydrocarbon first feed, e.g., a gas oil, is cracked principally as a result of contact with a large pore crystalline silicate zeolite cracking catalyst, e.g., zeolite Y, to provide lighter products. Spent catalyst is separated from the product stream and enters the dense fluid catalyst bed in the lower section of the stripping vessel. A $C_{3-4}$ olefin-rich second feed, meanwhile, undergoes conversion to cyclic and/or alkylaromatic hydrocarbons in a second riser, principally as a result of contact with a shape selective medium pore crystalline silicate zeolite, e.g., zeolite ZSM-5. Spent catalyst recovered from the product stream of the second riser similarly enters the dense catalyst bed within the stripper vessel. U.S. Pat. No. 3,894,934 also features the optional introduction of a $C_3$-containing hydrocarbon third feed along with an aromatic-rich charge into the dense fluid bed of spent catalyst above the level of introduction of the stripping gas to promote the formation of alkyl aromatics therein. As desired, the third feed may be light gases obtained from a fluid cracking light ends recovery unit, virgin straight run naphtha, catalytically cracked naphtha, thermal naphtha, natural gas constituents, natural gasoline, reformates, a gas oil, or a residual oil of high coke-producing characteristics.

SUMMARY OF THE INVENTION

It is an object of the present invention to provide a fluid catalytic cracking operation featuring at least two riser reaction zones, at least one stripping zone and at least one catalyst regeneration zone employing a mixed catalyst system comprising, as a first catalyst component, an amorphous cracking catalyst and/or a large pore crystalline cracking catalyst and, as a second catalyst component, zeolite Beta and/or a shape selective medium pore crystalline silicate zeolite catalyst.

It is a particular object of the invention to carry out a fluidized catalytic cracking operation employing said mixed catalyst system in which a heavy hydrocarbon feed, e.g., gas oil and/or resid, is cracked in a first riser reaction zone to provide lighter products including substantial quantities of naphtha and light olefins and a $C_{3-6}$ paraffin-rich charge material is cracked in a lower region of a second riser to provide light olefins at least part of which undergoes conversion further up the riser to higher molecular weight products whereby a relatively high octane gasoline product is obtained.

It is still another object of the invention to convert a heavy hydrocarbon feed to a high octane gasoline product in a dual riser catalytic cracking unit wherein different physical characteristic(s) of the first and second catalyst components permits separation, or segregation, of the catalyst components within a common stripping vessel and/or a prolongation of the residency time of the second catalyst component within one of the risers, such capability permitting a reduction in the rate of circulation of the less coke deactivated second catalyst component through the regeneration zone, and consequently, a conservation of its catalytic activity.

Yet another object of the invention consists in hydrotreating the heavy hydrocarbon feed prior to its introduction a riser utilizing hydrogen recovered from the process.

In keeping with the foregoing objects, there is provided a catalytic cracking operation featuring multiple risers in which a variety of hydrocarbon conversion reactions take place, a stripping unit in which entrained hydrocarbon material is removed from catalyst and a regeneration zone in which spent cracking catalyst is regenerated, which comprises:

(a) catalytically cracking a heavy hydrocarbon charge material in a first riser in the presence of a first catalyst component which is an amorphous cracking catalyst and/or a large pore crystalline zeolite cracking catalyst to provide a variety of products including naphtha and $C_3$ and/or $C_4$ olefins;

(b) thermally and catalytically cracking a $C_{3-6}$ paraffin-rich charge material introduced to a second riser in a lower region thereof to provide light olefins; and, (c) catalytically converting at least a portion of the light olefins resulting from step (b) within the second riser in a higher region thereof in the presence of a second catalyst component which is at least one member of the group consisting of zeolite Beta and a shape-selective medium pore crystalline silicate zeolite to provide a relatively high octane gasoline product.

The term "catalyst" as used herein shall be understood to apply not only to a catalytically active material but to one which is composited with a suitable matrix component which may or may not itself be catalytically active.

Temperature control within each riser, and therefore the nature of the principal conversion products produced therein, can be achieved by controlling the quantities of catalyst transferred thereto from the stripping unit and/or regenerator. As a result of such temperature control, and by suitable regulation of the catalyst contact times, it is possible to operate the process so as to maximize the overall conversion of feed to high octane gasoline or, if desired, the production of light olefins (at some expense to gasoline quality and yield) such as $C_3$ and/or $C_4$ olefins for use in alkylation reactions.

DESCRIPTION OF THE PREFERRED EMBODIMENTS

Figure 1:
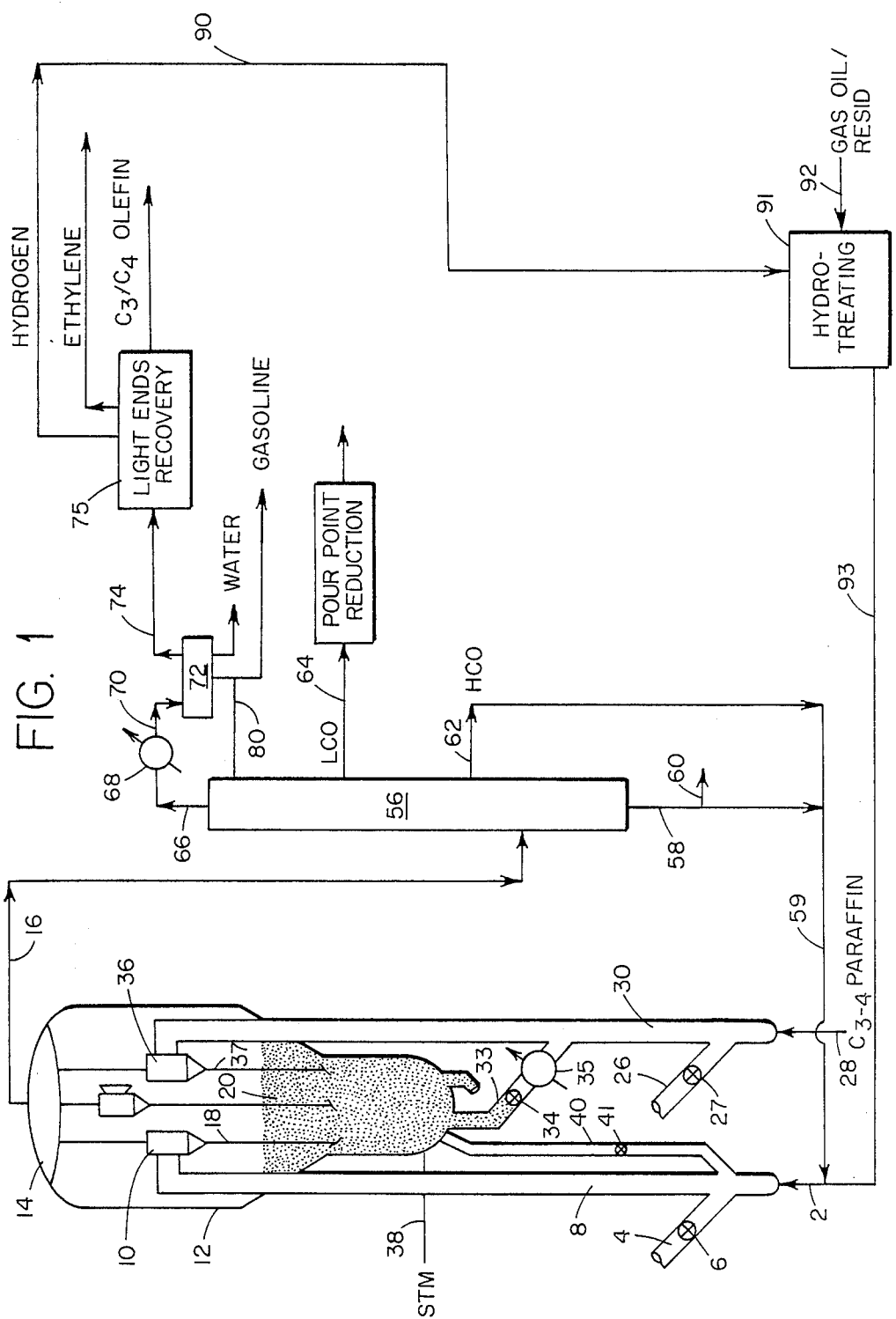
FIG. 1 schematically illustrates a fluidized catalytic cracking operation in accordance with this invention; and, FIG. 2 schematically illustrates another type of fluidized catalytic cracking operation of the present invention wherein the stripping unit features means for separating the first and second catalyst components based primarily on differences in their average particle sizes and densities, such arrangement making it possible to cycle the second catalyst component without exposing it to the catalyst-degrading conditions of the regenerator.

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts a the first catalyst component of the mixed catalyst system. Preferred crystalline zeolite components of the mixed catalyst system herein include the natural zeolites mordenite and faujasite and the synthetic zeolites X and Y with particular preference being accorded zeolites Y, REY, USY and RE-USY and mixtures thereof.

The shape selective medium pore crystalline silicate zeolite catalyst constituting the second catalyst component of the mixed catalyst system is exemplified by ZSM-5, ZSM-11, ZSM-12, ZSM-23, ZSM-35, ZSM-38 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective crystalline silicate zeolites of the mixed catalyst system herein are ZSM-5, ZSM-11, ZSM-12, ZSM-23, ZSM-35, ZSM-38 and ZSM-48 with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, zirconium, titanium and any other trivalent metal which is heavier than aluminum. Specific examples of such catalysts include ZSM-5 and zeolite Beta containing boron, gallium, zirconium and/or titanium. In lieu of, or in addition to, being incorporated into the zeolite framework, these and other catalytically active elements can also be deposited upon the zeolite by any suitable procedure, e.g., impregnation. It is also within the scope of this invention to employ a mixed catalyst system in which the first component is a large pore zeolite cracking catalyst such as zeolite Y and the second component is zeolite Beta, advantageously one containing boron, gallium, zirconium and/or titanium as part of its framework structure and/or deposited thereon.

In known and conventional fluidized catalytic cracking operations employing mixtures of large and medium pore size crystalline silicate zeolite catalysts where catalyst separated from the product effluent is conveyed to a stripper and from there to a catalyst regenerating zone, regardless of the nature of the catalyst introduction at start-up, once steady-state operation has been achieved, the two types of catalyst will become fairly uniformly mixed and will circulate throughout the system at or about the same rate. This arrangement is subject to a significant disadvantage. While the large pore zeolite cracking catalyst cokes up relatively quickly and must therefore be regenerated at frequent intervals, this is not the case with zeolite Beta and the medium pore zeolites which can maintain their catalytic activity over many more cycles of operation. However, since the zeolites are in intimate admixture, heretofore there has been no practical means of conveying only the large pore zeolite catalyst to the catalyst regenerator unit or, what amounts to the same thing, keeping the zeolite Beta catalyst and/or medium pore zeolite catalyst, or at least most of it, on the average out of the regenerator.

Thus, a principal disadvantage resulting from the use of mixed catalyst systems in known fluidized catalytic cracking operations is owing to the fact that the zeolite Beta and/or medium pore zeolite component is subjected to the harsh hydrothermal conditions of the catalyst regenerator unit even though it does not require regeneration anywhere near the rate at which the large pore zeolite cracking catalyst component must be regenerated. Zeolite Beta and/or the medium pore zeolite catalyst is therefore needlessly subjected to hydrothermal deactivation at a much greater rate than is necessary for it to function.

Separating the mixed catalyst system into its first and second catalyst components does much to overcome this drawback. Thus, once particles of first component are separated from particles of second component, the former can be conveyed to the regenerator while the latter can be cycled directly back to the appropriate riser thereby avoiding passage through the regenerator. Such separation can precede or follow stripping of the catalyst components. As applied, for example, to a fluidized catalytic cracking process in which a cracking catalyst requiring frequent regeneration such as zeolite Y is employed in combination with a catalyst requiring relatively infrequent regeneration such as zeolite Beta and/or a shape selective medium pore crystalline silicate zeolite such as ZSM-5, the present invention makes it possible to sustain relatively higher levels of activity of the latter type catalyst for much longer average periods than would otherwise be the case due to the reduced incidence of its exposure to the catalyst-degrading environment of the regenerator zone. This in turn, permits the refiner to take greater advantage of the unique catalytic capabilities of zeolite Beta and/or ZSM-5 in a catalytic cracking operation.

Separation of particles of first catalyst component from particles of second catalyst component in the stripper unit can be accomplished in several ways. For example, the two components can be provided in such different average particle sizes that they can be readily sorted within a stripping unit possessing suitable sieving means, an arrangement more particularly described in connection with the dual riser fluidized catalytic cracking unit illustrated in FIG. 2, infra.

Separation within the stripping zone can also be achieved by classifying the first and second catalyst components according to their average particle densities which can be made to be significantly different in various ways including by appropriate selection of the matrix components with which they are composited as more fully explained below. In general, smaller, less dense catalyst particles will tend on the average to define an upper phase within the stripper floating upon larger, more dense catalyst particles which, conversely, will tend on the average to define a lower phase within the stripper.

It is also within the scope of this invention to impart such different physical characteristic(s) to the first and second catalyst components that they each will exhibit different settling rates, designated $R_1$ and $R_2$ respectively, which permit the catalyst particles having the greater settling rate to remain within a riser reaction zone longer than the catalyst particles having the lower settling rate. Preferably, the second catalyst component, i.e., the less coke deactivated one, is given a higher settling rate as to reside in the second riser for a longer period of time than the first catalyst component. Thus, this arrangement permits operation of the second riser with hot freshly regenerated cracking catalyst providing sufficient heat in the lower section thereof as to effect thermal cracking of the $C_{3-6}$ paraffin-rich feed to light olefins, the latter undergoing conversion further up the riser within the concentrated zone of zeolite Beta and/or medium pore shape selective zeolite catalyst to provide a high octane gasoline product.

Residency time of catalyst particles in a riser is primarily dependent on two factors: the linear velocity of the fluid stream within the riser which tends to carry the entire catalyst bed/conversion products/unconverted feed up and out of the riser into the separator unit and the opposing force of gravity which tends to keep the slower moving catalyst particles within the riser. Ordinarily, in a mixed catalyst system, both catalyst components will circulate through the system at about the same rate. As previously pointed out, this has proven disadvantageous to the efficiency of the system since the medium pore zeolite catalyst or other catalyst component which does not require as frequent regeneration as the zeolite cracking catalyst will be needlessly subjected to the catalyst-degrading conditions of the regenerator with the result that its useful catalytic life will be shortened. However, in accordance with this invention, it is possible to retain the less coke deactivated catalyst within the riser, even to the point where, because of a balance between the upward velocity of this catalyst component and its settling rate, it can be made to remain more or less stationary, or suspended, at any desired level within the riser defining a zone of concentration therein. To bring about this balance or to otherwise prolong the residency time of a particular component of the mixed catalyst system within the riser, the average density, particle size and/or shape of the catalyst particles can be adjusted in a number of ways as to provide the desired settling characteristics. As a general guide, as the average particle size of the catalyst increases and/or its average particle density increases, the residency time of the catalyst will increase.

Assuming, for example, this differential in $R_1$ and $R_2$ is accomplished by making the particles of the second catalyst component initially larger and of greater density than the particles of first catalyst component and perhaps even more irregular in shape than the latter, gradual attrition of the larger particles (through particle collision) will progressively reduce their capability for prolonged residency in the riser and as time goes on, increasing quantities of such particles will enter the stripping zone where, however, they can still be readily separated based on their different densities as later more fully explained. This arrangement, i.e., increased residency time in the riser coupled with separation in the stripping zone, maximizes the capability of the catalytic cracking process of this invention for reducing the rate of circulation of the less coke deactivated catalyst particles through the regenerator zone.

Among the techniques which can be used for making one catalyst component more dense than the other is compositing each catalyst with a matrix component of substantially different density. Useful matrix components include the following:

| matrix component | particle density (gm/cm$^3$) |
|---|---|
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be more dense than the catalyst requiring frequent regeneration. For example, in the case of a mixed catalyst system containing medium pore and large pore crystalline silicate zeolites where it is desired to increase the residency time of the medium pore zeolite catalyst in the riser, the overall packed density of the medium pore zeolite catalyst particles inclusive of its matrix component can advantageously vary from about 0.6 to about 4.0 gm/cm$^3$, and preferably from about 2.0 to about 3.0 gm/cm$^3$, and the overall packed density of the large pore zeolite catalyst particles inclusive of its matrix component can advantageously vary from about 0.4 to about 1.1 gm/cm$^3$ density, and preferably from about 0.6 to about 1.0 gm/cm$^3$.

Another useful technique for adjusting the density of each catalyst component, again in the case of a mixture of medium and large pore zeolite catalysts, is to composite the medium pore zeolite catalyst particles with a material which tends to coke up faster than the particles of large pore zeolite catalyst, such resulting in an increase in the density of the former in situ. Illustrative of such materials is hydrated alumina which in situ forms a transition alumina which has a high coking rate. This embodiment possesses several additional advantages. In the coked-up state, the composited medium pore silicate zeolite catalyst is more resistant to attrition which results from collision with other particles in the riser. The individual catalyst particles can sustain more collisions and thus serve as a practical means of adjusting the velocity of the large pore zeolite catalyst particles through the riser (the latter in colliding with the medium pore zeolite catalyst particles will, as a result, have reduced velocity). In addition, the coked-up composited medium pore zeolite catalyst particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to remain within the riser longer than the smaller. Where, as here, it is desired to increase the residency time of the medium pore zeolite catalyst particles in the first riser over that of the large pore zeolite catalyst component, the average particle size of the former will usually be larger than that of the latter. So, for example, the average particle size of the medium pore zeolite catalyst particles can be made to vary from about 500 microns to about 70,000 microns, and preferably from about 1000 to about 25,000 microns while the average particle size of the large pore zeolite catalyst particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the longer the residency time of the particles in the riser. Irregular-shaped particles can be simply and readily achieved by crushing the catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the less coke deactivated catalyst can simultaneously be made denser, larger and more irregular in shape than the catalyst particles requiring frequent regeneration. However, a differential settling rate can still be provided even if one of the foregoing factors partially offsets another as would be the case where greater density and smaller average particle size coexist in the same catalyst particle. Regardless of how these factors of particle density, size and shape are established for a particular catalyst component, their combined effect will, of course, be such as to result in a significant differential in settling rates of the components comprising the mixed catalyst system of this invention.

By varying the cross sectional geometry of the riser, it is possible to further prolong the residency time therein of the denser, larger and/or more irregularly shaped catalyst particles. Numerous geometric configurations can be utilized to achieve this effect. So, for example, the riser can be made to flare outwardly for a part of its length. In one such arrangement, some portion of the upper section of the riser can be flared outwardly. The denser, larger and/or more irregularly shaped particles will tend to occupy the flared region of the riser as to constitute a zone of concentration therein.

The shape selective medium pore crystalline silicate zeolite catalyst can be present in the mixed catalyst system over widely varying levels. For example, a zeolite concentration of the second catalyst component can be present at a level as low as about 0.01 to about 1.0 weight percent of the total catalyst inventory (as in the case of the catalytic cracking process of U.S. Pat. No. 4,368,114) and can represent as much as 25 weight percent of the total catalyst system.

Suitable charge stocks for cracking in the first riser comprise the heavy hydrocarbons generally and, in particular, petroleum fractions having an initial boiling point range of at least 400° F., a 50% point range of at least 500° F. and an end point range of at least 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking.

The $C_{3-6}$ paraffin-rich paraffin feed can be obtained from any suitable source, e.g., the product of a high temperature catalytic cracking operation, petroleum fractionation, natural gas, etc.

Referring to FIG. 1, a gas oil/resid feed is introduced to the cracking unit by conduit 2 where it is combined with hot regenerated catalyst comprising zeolite Y in admixture with ZSM-5 in conduit 4 containing flow control valve 6 to form a suspension of catalyst particles in oil vapors which pass upwardly through first riser reactor 8. The conversion conditions within first riser 8 can be varied depending upon whether it is desired to maximize production of naphtha or light olefins, principally $C_3$ and $C_4$ olefins but including some ethylene as well. Shifting of varying amounts of stripped, non-regenerated catalyst mixture from the stripper to riser 8 through conduit 40 provided with flow control valve 41 permits regulation of the ZMS-5 concentration in the riser and assists in maintaining control of the temperature therein. When it is desired to emphasize the production of naphtha, the EWEEEA-5 zeolite in the second catalyst can represent from about 0.1 to about 10, and preferably from about 0.2 to about 5, weight percent of the total catalyst mixture and the temperature can range from about 900° to about 1150° F. and preferably from about 925 to about 1000° F., the catalyst to oil ratio can range from about 3:1 to about 20:1 and preferably from about 4:1 to about 10:1 and the catalyst contact time can range from about 0.5 to about 30 seconds and preferably from about 1 to about 15 seconds. When, however, light olefin production (at the expense of naphtha) is desired, the ZSM-5 zeolite in the second catalyst can comprise from about 1 to about 25, and preferably from about 2 to about 10, weight percent of the total catalyst mixture, the temperature, catalyst to oil ratio and catalyst contact time being selected from the aforementioned ranges. During passage of the suspension through the riser, conversion of the gas oil feed to lower boiling products occurs. These products are separated after removal of catalyst therefrom in a cyclone separator 10 housed in the upper portion of vessel 12. Separated hydrocarbon vapors pass into plenum chamber 14 and are removed therefrom by conduit 16 for separation in downstream operations. Catalyst separated in cyclone 10 is conveyed by dipleg 18 into a bed of catalyst 20 therebelow. In fractionation zone 56, a separation of the products of conversion from riser 8 is made to recover main column bottoms (MCB) from the bottom of the fractionator by conduit 59 communicating with conduit 2 for recycle to riser 8 as desired. On the other hand, the main column bottoms may be withdrawn by conduit 60 for other use. A heavy cycle oil (HCO) is withdrawn by conduit 62 for recycle by conduit 59 to riser 8. A light cycle oil (LCO) product, is withdrawn by conduit 64. An overhead fraction lower boiling than the light cycle oil and comprising gasoline and lower boiling hydrocarbons are withdrawn from an upper portion of fractionator 56 by conduit 66. The withdrawn material in conduit 66 passes through cooler 68 and conduit 70 to knockout drum 72 wherein condensed liquids such as water and gasoline boiling material are separated from lower boiling gaseous components. The low boiling gaseous components are withdrawn by conduit 74 for passage to a light ends recovery operation 75 wherein a separation is made to recover, for example, ethylene and $C_3$ and/or $C_4$ olefins. A gasoline boiling range fraction separated in drum 72 is recycled by conduit 80 as reflux to the fractionator tower.

Hot freshly regenerated catalyst is passed to the inlet of second riser 30 by conduit 26 equipped with valve means 27. A $C_{3-4}$ paraffin-rich stream is introduced by conduit 28 to a lower region of second riser 30 for admixture with the catalyst to form a suspension. The conditions of conversion of the $C_{3-4}$ paraffin-rich feed in the lower section of riser 30 can include a temperature of from about 1100° to about 1500° F. and preferably from about 1250° to about 1350° F., a catalyst to feed ratio of from about 50:1 to about 200:1 and preferably from about 100:1 to about 150:1 and a catalyst contact time of from about 10 to about 50 seconds and preferably from about 15 to about 35 seconds. These relatively severe operating conditions generally make it desirable to expand the diameter of the second riser for that portion of its initial length in which thermal cracking is the dominant conversion reaction. As a result of thermal cracking, the $C_{3-4}$ paraffin feed is converted to substantial quantities of light olefins, principally propylene and butylenes but including some ethylene as well, with hydrogen as an additional product. Hydrogen recovered from the operation can be used for any suitable purpose but is advantageously employed in hydrotreating the heavy hydrocarbon charge to the first riser prior to its introduction therein as described infra As the catalyst-hydrocarbon suspension formed in the lower region of second riser 30 continues to ascend therein, it enters an upper region where conversion of at least a portion of the light olefin referred to above to gasoline boiling range components is effected. Temperature control within this uppe region and other factors influencing the nature of the conversion occurring therein can be controlled by adjusting the quantity of stripped, non-regenerated catalyst mixture introduced therein through conduit 33 provided with control valve 34 and cooler 35. The non-regenerated catalyst mixture, while having little non-selective cracking activity remaining (due to the essentially spent condition of the zeolite Y component), retains much of its aromatization activity (attributable to the ZSM-5 component). Depending upon its temperature, the catalyst mixture can serve as a quench to reduce the temperature in the upper region of the second riser to the point where more oligomerization and less aromatization will result.

In general, lower temperatures favor higher liquid recovery at, however, the expense of octane number of the gasoline product. Conversely, higher temperatures favor increased aromatization but greater gas production (e.g., hydrogen, methane and some other light paraffins) with consequent lower liquid recovery but with a beneficial increase in the octane number of the gasoline product. In general, the temperature within the upper region of riser 30 can be maintained within the range of from about 400° to about 1000° F., preferably from about 650° to about 800° F., a catalyst to hydrocarbon ratio of from about 5:1 to about 40:1, preferably from about 20:1 to about 30:1 and a catalyst contact time of from 5 to about 45 seconds, preferably from about 25 to about 35 seconds. The hydrocarbon product/catalyst stream continues upwardly within riser 30 to be discharged into cyclone separator 36 provided with dipleg 37 in the upper portion of vessel 12. Catalyst discharged from diplegs 18 and 37 is collected in the lower portion of vessel 12 as a fluid bed of catalyst particles 20 moving generally downwardly through the vessel and through a stripping zone provided in the lowermost portion of vessel 12. Stripping gas, e.g., steam, is added to the lower portion of the stripping zone by conduit 38. The products of conversion from riser 30 are passed to plenum chamber 14 and are removed therefrom by conduit 16 communicating with a conventional product recovery unit as previously described.

Catalyst particles comprising particularly the zeolite Y cracking component of the mixed catalyst system herein accumulate a relatively high level of coked hydrocarbonaceous material therein which is subsequently removed by regeneration with oxygen-containing regeneration gases in a catalyst regeneration unit (not shown) of known design and operation.

It is advantageous to utilize hydrogen recovered from the foregoing cracking operation in the hydrotreating of the gas oil/resid charge stock, especially where the latter contains fairly high quantities of metal contaminants and/or sulfur-containing material. Thus, hydrogen recovered from a gas plant operation indicated generally at 75 is conveyed through conduit 90 to hydrotreating unit 91 supplied with a gas oil/resid feed through conduit 92. The hydrotreating unit is operated in accordance with conventional or otherwise known conditions in the presence of suitable hydrotreating catalysts, e.g., cobalt and molybdenum oxides on alumina, nickel oxide, nickel thiomolybdate, tungsten and nickel sulfides, and vanadium oxide. The hydrotreated gas/oil resid at elevated temperature is conveyed through conduits 93 and 2 to first riser reactor 8 as previously described.

Figure 2:
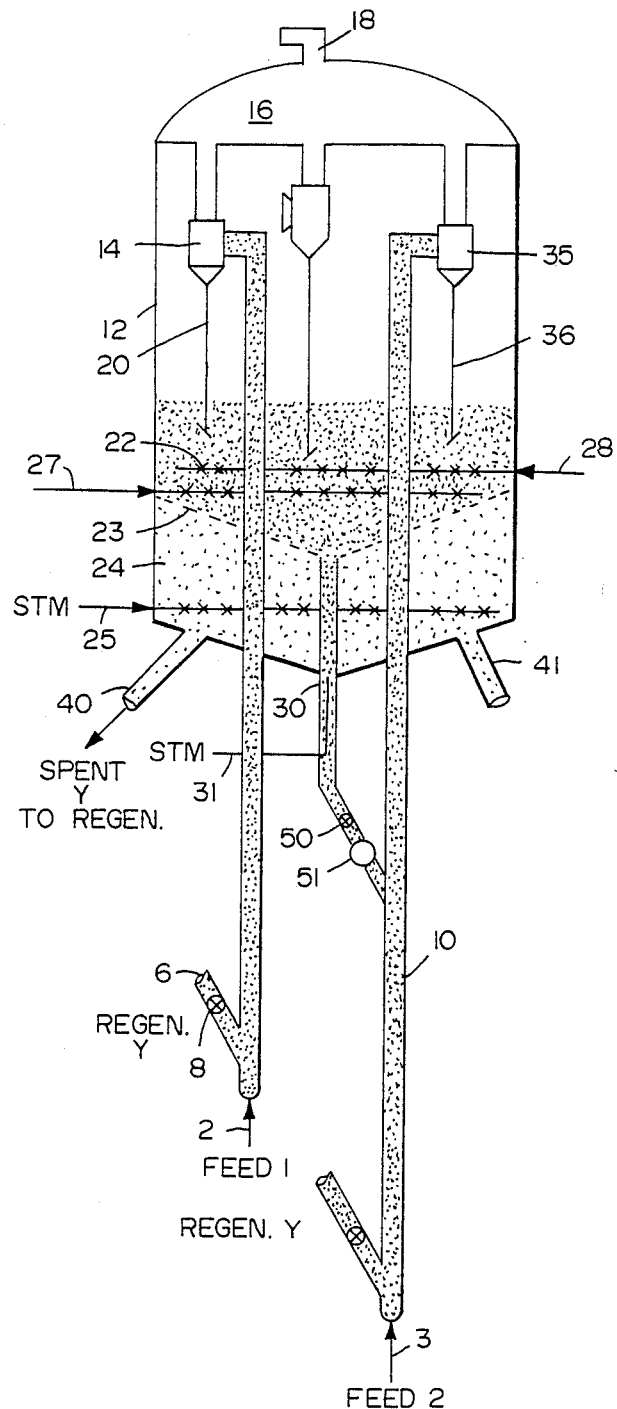

FIG. 2 is illustrative of a dual riser fluid catalytic cracking operation featuring separation of the catalyst components in the stripper in accordance with a preferred embodiment of the process of this invention. Both risers can be operated in accordance with the conditions described above in connection with the embodiment of FIG. 1. A gas oil feed (Feed 1) is introduced to first riser 4 by conduit 2 and is combined with hot regenerated zeolite Y cracking catalyst in conduit 6 containing flow control valve 8 to form a suspension of catalyst particles in oil vapors which pass upwardly through the riser. The individual particles of zeolite Y catalyst are appreciably smaller and less dense than the particles of ZSM-5 catalyst which is also utilized in the conversion process. Riser 4 discharges directly into a cyclone separator 14 housed in the upper portion of vessel 12. In cyclone separator 14, hot cracking catalyst is separated from hydrocarbon product of cracking. Separated hydrocarbon vapors pass into plenum chamber 16 and are removed therefrom by conduit 18 for separation in downstream equipment (not shown). Spent cracking catalyst separated in cyclone 14 is conveyed by dipleg 20 into catalyst bed 22. A conically shaped perforate plate or sieve 23 separates the larger, denser ZSM-5 catalyst particles from the zeolite Y catalyst particles, the latter passing through the sieve to the lower section 24 of the stripping zone. Stripping gas, in this case steam, is introduced through conduit 25 where it removes entrained hydrocarbon material from both catalyst components. The ZSM-5 particles gravitate toward the bottom of sieve 23 and eventually enter return conduit 30 provided with a source of low pressure steam 31 which blows smaller, less dense particles of zeolite Y catalyst which may have become entrained with the ZSM-5 catalyst particles back up into catalyst bed 22. Zeolite Y catalyst particles entering lower section 24 of the stripper zone are, following stripping, conveyed through one or more conduits 40 and 41 to the catalyst regeneration zone. Following regeneration, the zeolite Y catalyst is reintroduced to first riser 4 and second riser 10.

In second riser 10, a suspension of hot regenerated catalyst and a $C_{3-4}$ paraffin-rich feed (Feed 2) introduced into the lower section of the riser through conduit 3 results in thermal and catalytic cracking of the feed to light olefins taking place therein as previously described. The suspension of catalyst and hydrocarbon vapors continues to move upwardly through riser 10 where it is combined with stripped ZSM-5 catalyst particles introduced through conduit 30 provided with valve 50 and cooler 51. The suspension is eventually discharged into one or more cyclonic separators 35 provided with dipleg 36. Separated catalyst enters bed 22 where it is separated into its ZSM-5 and zeolite Y catalyst components by the aforedescribed sieving operation, the conversion products meanwhile being combined with the other gaseous streams in plenum chamber 16 for transfer through conduit 18 to a downstream separation facility (not shown).

In order to enhance the overall efficiency of the operation, a light olefin feed, e.g., a gas rich in ethylene, can be introduced through conduit 27 to the lower section of catalyst bed 22 containing a concentration of ZSM-5 catalyst particles. The conversion of the light olefin feed which takes place in the lower section of catalyst bed 22 produces higher weight products and an exotherm which improves the absorption efficiency of the stripping operation. In general, the quantity of light olefin feed should be such as to increase the temperature of the catalyst bed in this region by at least about 50° F., and preferably by at least about 100° F. To accomplish this, from about 0.5 to about 20, and preferably from about 1 to about 10, weight percent of light olefin feed can be introduced into this catalyst phase by weight of total catalyst present in the stripper. Ordinarily, then, the temperature of the catalyst bed will increase from its usual range of about 880°–1150° F. to about 930°–1250° F. and even higher. This increase in spent catalyst bed temperature significantly enhances the stripping, or desorption, of hydrocarbons and, where present, sulfur compounds, which are entrained by the catalyst particles. Thus, in carrying out the foregoing improved stripping process, it is possible to increase the recovery of such entrained hydrocarbons by from about 5 to about 30 weight percent or more compared to substantially the same stripping procedure carried out in the absence of the exothermic conversion reaction herein. Optionally, where the light olefin feed in line 27 is predominantly made up of ethylene, one or more other highly reactive light olefins, e.g., propylene, butylene or mixtures thereof, can be introduced into the lower catalyst phase through a separate conduit 28 in order to take advantage of the higher partial pressure of the ethylene contained in the feed stream introduced through line 27 located therebelow. Amounts of C and/or $C_4$ olefin material ranging from about 0.1 to about 5, and preferably from about 0.2 to about 3, weight percent of the entire catalyst bed can be suitably employed.

From the foregoing, it will be appreciated that due to the separation of ZSM-5 catalyst particles from zeolite Y catalyst particles in the stripper, it is possible to have much of the ZSM-5 catalyst bypass the regenerator altogether. As a result, the ZSM-5 catalyst particles are retained in the catalyst inventory at a higher level of activity therein for a longer average period of time than would be the case were they to circulate through the system more or less together with the zeolite Y catalyst particles.

Having thus provided a general discussion of the present invention and described specific embodiments in support thereof, it is to be understood that no undue restrictions are to be imposed by reason thereof except as provided by the following claims.

What is claimed is:

1. A catalytic cracking process undertaken in at least two risers, said two risers being in communication with each other via a catalyst regeneration zone, which process comprises, providing a first catalyst component as particles which have a first settling rate and providing a second catalyst component as particles which have a second settling rate, which second catalyst component comprises a medium pore zeolite, wherein said first settling rate is different from said second settling rate, wherein settling rate is a function of a physical property selected from the group consisting of density, particle size and shape;

cracking a feed which is a gas oil or a resid in a first of said two risers, in the presence of particles of said first catalyst component selected from the group consisting of an amorphous cracking catalyst and a large pore crystalline cracking catalyst at 980° to 1050° F.; and separating products of cracking from catalyst in a stripper;

thermally and catalytically cracking $C_3$-$C_6$ paraffin rich charge material introduced to a second riser of said two risers in a lower region of said second riser to produce a product mixture comprising propylene, butylene, ethylene and hydrogen; wherein the heat for thermally and catalytically cracking said charge material is provided by regenerated catalyst from the regenerator which is conveyed to the lower region of said second riser;

passing, from the stripper, particles of said second catalyst component, to downstream of said lower region and passing said product mixture downstream of said lower region of said second riser wherein said product mixture downstream of said lower region is contacted with particles of said medium pore zeolite, to reduce temperature in an upper zone of said second riser, contacting said product mixture with the medium pore zeolite in said upper zone of said second riser to convert said product mixture to high octane gasoline comprising aligomers of said ethylene, propylene and butylene;

separating said high octane gasoline from said medium pore zeolite;

separating particles of said medium pore zeolite from particles of said first catalyst component in said stripper, wherein a difference between said first settling rate and said second settling rate allows said separating said medium pore zeolite from said first catalyst component; and passing the separated medium pore zeolite from said stripper to said downstream of said lower region and passing separated particles of first catalyst component to the regenerator; and passing from the regenerator regenerated catalyst to the lower region of said second riser.

2. The process of claim 1, wherein in the first riser, the zeolite concentration of the medium pore zeolite represents from about 0.1 to about 10 weight percent of the total catalyst mixture, the catalyst to oil ratio is from about 3:1 to about 20:1 and the catalyst contact time is from about 0.5 to about 30 seconds.

3. The process of claim 1, wherein in the first riser, the medium pore zeolite concentration represents from about 0.2 to about 5.0 weight percent of the total catalyst mixture, the temperature is within the range of from about 925° to about 1050° F., the catalyst to feed ratio is from about 4:1 to about 10:1 and the catalyst contact time is from about 1 to about 15 seconds.

4. The process of claim 1, wherein the first riser, the medium pore zeolite concentration can comprise from about 1 to about 25 weight percent of the catalyst mixture, the catalyst to feed ratio is from about 3:1 to about 20:1 and the catalyst contact time is from about 0.5 to about 30 seconds.

5. The process of claim 4, wherein in the first riser, the medium pore zeolite concentration can comprise from about 2 to about 10 weight percent of the total catalyst mixture.

6. The process of claim 1 wherein in the lower region of the second riser, the temperature is within the range of from about 1110° to about 1500° F., the catalyst to feed ratio is from about 50:1 to about 200:1 and the catalyst contact time is from about 10 to about 50 seconds.

7. The process of claim 1, wherein in the lower region of the second riser, the temperature is within the range of from about 1250° to about 1350° F., the catalyst to feed ratio is from about 100:1 to about 150:1 and the catalyst contact time is from about 15 to about 35 seconds.

8. The process of claim 1, wherein in the upper region of the second riser, the temperature is within the range of from about 400° to about 1000° F., the second catalyst component to hydrocarbon ratio is from about 5:1 to about 40:1 and the catalyst contact time is from about 5 to about 45 seconds.

9. The process of claim 1, wherein in the upper region of the second riser, the temperature is within the range of from about 650° to about 800° F., the second catalyst component to hydrocarbon ratio is from about 20:1 to about 30:1 and the catalyst contact time is from about 25 to about 35 seconds.

10. The process of claim 1, wherein the heavy hydrocarbon charge material is subjected to hydrotreatment prior to its introduction in the first riser.

11. The process of claim 10, wherein the hydrotreatment utilizes hydrogen recovered from the catalytic cracking process.

12. The process of claim 1, wherein products of cracking said gas oil or resid comprises $C_3$–$C_6$ paraffin rich charge material.

* * * * *